Patented Nov. 16, 1948

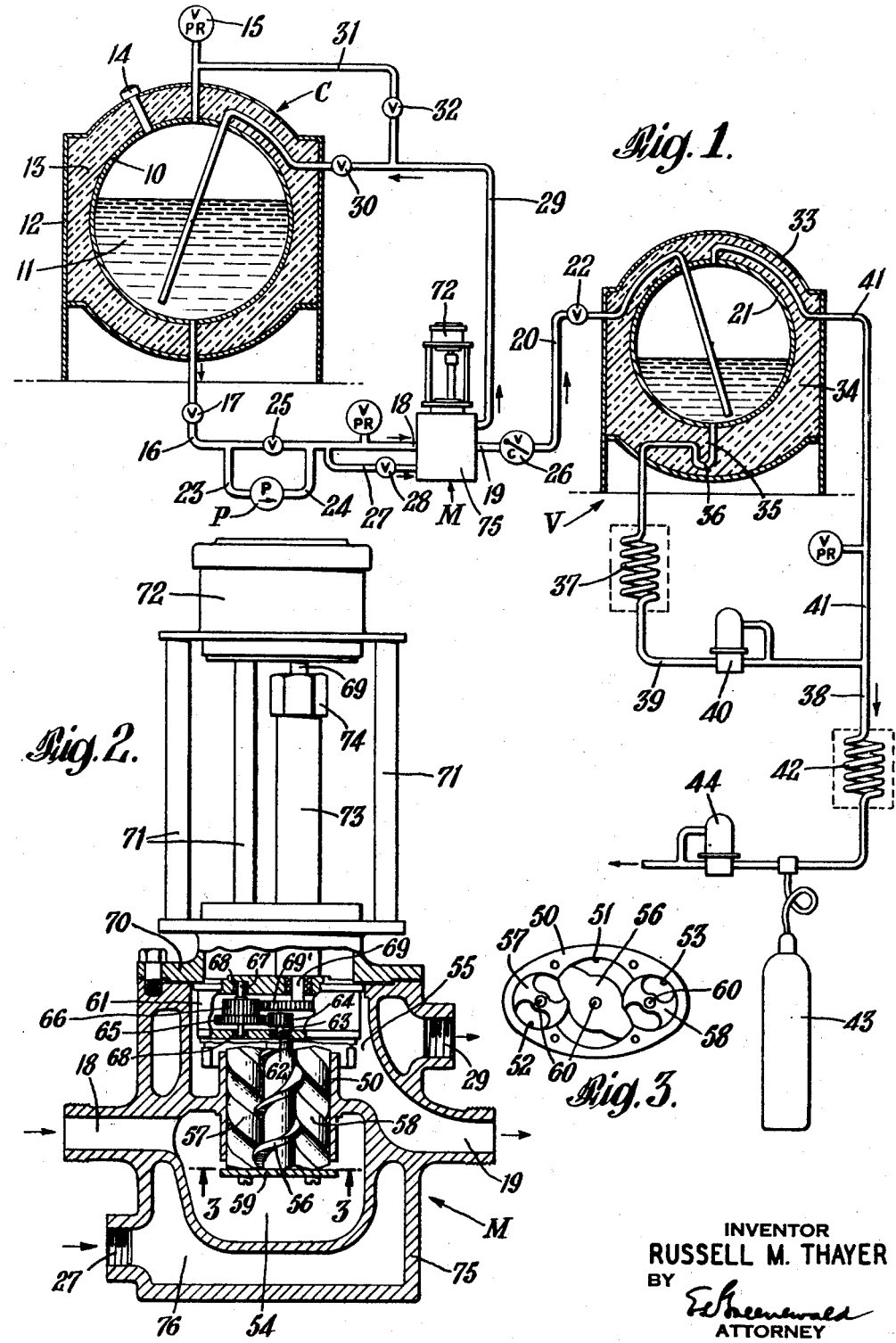

2,453,766

UNITED STATES PATENT OFFICE 2,453,766

PROCESS AND APPARATUS FOR TRANSFERRING MEASURED QUANTITIES OF LIQUEFIED GAS

Russell M. Thayer, Kenmore, N. Y., assignor to The Linde Air Products Company, a corporation of Ohio Application October 29, 1943, Serial No. 508,270

8 Claims. (Cl. 62—1)

This invention relates to a process and apparatus for transferring measured quantities of a low boiling liquefied gas from one container to another, and particularly to a process of and apparatus for metering liquid oxygen passed into a receiving vessel.

Objects of the present invention are: to provide a method of and apparatus for transferring accurately measured variable quantities of a highly volatile liquefied gas from a container to a receiver and more particularly from a container where it is held at relatively low pressure to a receiver at a higher pressure. Other objects of the invention are: to provide such a method and apparatus in which the metering chamber of a meter is precooled so that the meter will accurately register the quantity of liquid throughout the entire liquid transferring operation, and in which the liquid, while it is passing through the metering chamber, is maintained in a subcooled condition so that vapor formation will not affect the accuracy of measurement.

Further objects of the present invention are: to provide a meter adapted successfully to meter liquid oxygen accurately; to provide a meter construction in which the register will not be subject to frosting; in which the register operating shaft seal is not adversely influenced by the low temperature of the liquid; and in which the relatively moving surfaces which are subject to the temperature of the liquid are not subject to binding or excessive wear.

These and other objects and advantages of this invention will become apparent from the following description and the accompanying drawings, in which:

Fig. 1 is a diagrammatic view of a system for transferring liquefied gas from a container to a receiving apparatus according to the principles of the present invention;

Fig. 2 is an elevational view of an exemplary meter with parts broken away to illustrate the construction of the metering chamber; and Fig. 3 is a view of a section taken on the line 3—3 of Fig. 2.

When it was desired to transfer a definite quantity of liquid oxygen from a low-pressure container to a receiving vessel at a higher pressure, it was necessary to calibrate the volume of the receiving vessel and to fill such a vessel to a predetermined level only after it had first been emptied of liquid, and while the pressure before and after the filling operation was carefully regulated to predetermined values. If liquid oxygen could be accurately metered while it is being transferred from a container to the receiving vessel and while the receiving vessel is under pressure and irrespective of such pressure, then it would be possible to add any desired quantity to such receiving vessel without interrupting the normal operation of the receiving vessel when it is part of a system for gasifying liquid oxygen and delivering the gas at the desired pressure for use.

For successfully metering liquid oxygen according to this invention, there is provided a positive displacement meter of a construction which will successfully meter liquid oxygen in spite of the severe limitations imposed by the low-temperature, non-lubricating properties, and combustion supporting properties of the liquid. Lubrication of the moving metering elements is obtained by making either the stationary or moving element of a self-lubricating material which is substantially inert with respect to liquid oxygen. A suitable material is a bonded carbon or bonded graphite. Any bearings in the gear train subject to liquid oxygen temperatures are arranged with at least one of the rubbing surfaces composed of similar material. The meter is provided with the customary register which is operated by the metering elements and is preferably mounted at a distance from the metering chamber so that the register is not subject to frosting. The packing seal for the drive shaft between the register and the metering elements is mounted at the end of an extended sleeve of a material having low heat conductivity so that the packing seal operates at temperatures at which it remains plastic.

The meter, according to the present invention, is positioned in the transfer line between the supply container and the receiving vessel. If liquid were passed through the meter, vaporization would occur in the meter which would cause the meter to over-register, i. e., indicate more liquid than actually passed through the meter. To prevent such over registration, the meter is provided with a cooling jacket connected by a by-pass line to the transfer line and to the supply container and liquid is passed from the transfer line through the by-pass and the cooling jacket and back to the supply container until all the parts are precooled to the liquid temperature. During the actual transfer of liquid through the meter, the pressure on the liquid on its passage to the meter must be high enough to provide sufficient subcooling so that liquid will not vaporize in the line ahead of the meter or in the meter itself. A subcooled liquefied gas is one in which the temperature of the liquid is below the boiling point temperature of such liquid corresponding to the existing pressure. The liquid may be subcooled or further subcooled by refrigeration or by increasing its non-equilibrium pressure and such pressure increase can be attained by a pump or by a non-equilibrium increase of the pressure of the vapor above the liquid in the supply container.

Referring now to the drawing, particularly Fig. 1, there is shown a supply container C, a pump P, the meter M, and a receiving and vaporizing apparatus indicated generally at V and all connected in series. The container C may be a storage vessel permanently installed or may be a transport vessel adapted to transport a supply of liquid oxygen from a central production plant. The container C comprises a tank 10 for holding a body of liquid 11 and supported within an outer casing 12, there being suitable heat insulation 13 interposed between the casing and the tank. The tank is provided with the customary closable filling connection 14 and pressure relief valve 15.

A liquid discharge line 16 controlled by a valve 17 leads from the bottom of the tank 10 through the casing 12 to the inlet 18 of the meter M. The discharge outlet 19 of the meter M is connected by a conduit 20 with a liquid receiving vessel 21 of the vaporizing apparatus V. A stop valve 22 controls the conduit 20. If the liquid in the container C can be supplied under a pressure higher than the pressure of the receiving vessel 21, the difference of pressures may be used to force the liquid through the meter M. When such pressure difference does not exist and particularly when the receiving vessel 21 is at a higher pressure, it is necessary to provide a pump P which may have its inlet 23 and its outlet 24 connected to the liquid discharge line 16 on either side of a stop valve 25 interposed therein. The conduit 20 is also provided with a non-return or check valve 26 to permit flow only in the direction from the meter to the vessel 21. The pump P may be of any type suitable for pumping the liquefied gas.

As hereinafter described, the meter M has a cooling jacket, the inlet of which is connected by a by-pass conduit 27 controlled by a valve 28 and connected to the discharge line 16 preferably on the discharge side of the pump P. The outlet of the meter cooling jacket is connected by a conduit 29 controlled by a valve 30, to the tank 10 of the supply container. The conduit 29 preferably dips into the liquid in the tank 10. A branch conduit 31 controlled by a valve 32 may also be provided to conduct gas from the conduit 29 to the upper portion of the tank 10.

The vaporizing apparatus V may be of any suitable type or construction, that illustrated in the drawing being merely exemplary. The vessel 21, of sufficient strength to resist the working pressures to which it is subjected, is disposed within a casing 33 that maintains a desired layer of heat insulation 34 around the vessel 21. Connected to the bottom of the vessel 21 is a discharge conduit 35 containing a return bend 36. The conduit 35 is connected to and conducts liquid to a vaporizing coil 37 which is suitably heated and then to a discharge line 38 by a connection 39. The connection 39 has interposed therein a pressure regulating valve 40 that opens to allow passage of gas whenever the pressure in the discharge line 38 is below the value for which the pressure regulator is set. The discharge line 38 is connected by a conduit 41 to the upper portion of the receiving vessel 21 and may have interposed therein a heating coil 42 to heat any gaseous oxygen flowing from the receiving vessel 21. If desired, a gas storage container 43 may be connected to the conduit 38 and the gas delivery end of the conduit 38 may be controlled by a pressure regulator 44.

The operation of transferring measured amounts of liquid from the supply container C to the vaporizing apparatus V is preferably started by opening the valves 17, 28, 22, and 30 and then starting the pump P. Liquid will be drawn from the tank 10 through the pump and will pass through the by-pass 27, the cooling jacket of the pump, and the conduit 29 back to the tank 10. Operation in this manner is continued until the discharge line 16, the pump P, and the meter M are completely precooled to the temperature of the liquid and all vapor is purged therefrom. By having the conduit 29 tip below the surface of the body of liquid 11, there will be no passage of liquid through the vapor in the space above the liquid body 11. This is advantageous since it is desirable to maintain the pressure in the tank 10 at a value such that the liquid being drawn from the bottom of the tank is at a pressure higher than the equilibrium pressure corresponding to the temperature of the liquid. When the meter has been adequately cooled, the valve 28 is closed, and flow of liquid will immediately occur through the meter from the inlet 18 to the outlet 19, through the check valve 26, and into the receiving vessel 21. Such flow may be continued until the meter registers indicates that the desired quantity of liquid has been passed into the vessel 21.

When the desired amount of liquid has been transferred, the valve 28 may be opened and the valve 17 closed. The valve 22 is also closed and any liquid remaining in the pump and meter jacket may be allowed to evaporate and the vapors therefrom allowed to pass through the conduit 29 to the tank 10.

During the filling of liquid into the vessel 21, the vaporizing apparatus may be allowed to operate in the normal manner. When the delivery of gas through the conduit 38 reduces the pressure below the set pressure of the regulator 40, this regulator opens and allows liquid to flow through the conduit 35 and the vaporizer 37. When the pressure is restored the regulator 40 closes and any liquid remaining in the vaporizer 37 becomes gasified and the gas produced backs up through the conduit 35 and then prevents further flow of liquid through the conduit 35 beyond the return bend 36.

An alternative method of operation may be practised when the supply container C is of a character permitting it to hold liquid under a pressure greater than the pressure of the receiving vessel 21. Under such conditions, a pump P will not be needed and the valve 25 may remain open. The meter M may be properly precooled by opening the valves 17, 28, and 32. This will allow portions of liquid to flow by gravity through the discharge line 16 and through the by-pass 27 into the meter jacket 76. The vapor produced in the meter jacket will rise in conduit 29 and pass through the connections 31 to the upper end of the tank 10. Such vaporization of liquid will increase the non-equilibrium pressure in the tank 10. When the meter M is adequately cooled the valve 22 may be opened to permit flow of liquid through discharge line 16, meter M, check valve 26, and through conduit 20 into the vessel 21. When the desired amount of liquid has passed into the vessel 21, the valve 22 is closed and then the valve 17 may be closed. The valves 28 and 32 may be left open until the liquid trapped in the line 16 and the meter jacket has evaporated.

The meter M may be any positive displacement meter in which a movable metering device cooperates with stationary metering chamber walls and the metering device operates in substantially fluid sealing engagement with such walls. The metering device is moved by the flow of liquid passing through the meter through a total displacement corresponding to the quantity of liquid passing. According to the present invention such a meter has either the metering chamber walls or the movable metering device constructed of bonded graphite or carbon.

As illustrated in Fig. 2 the type of metering elements preferably employed are similar to those disclosed in United States Patent No. 2,079,083 of C. O. J. Montelius, but having the improvements hereinafter described.

The meter M has a metering chamber 50, the inner walls of which comprise a vertical central cylindrical bore 51 and two cylindrical side bores 52 and 53 which are parallel to the central bore 51 and intersect the same. The bores are open at the upper and lower ends. The lower portion of the metering chamber extends into an inlet chamber 54 communicating with the inlet 18 and the upper portion of the metering chamber 50 extends into an outlet chamber 55 having the outlet 19. Rotatably mounted within the central bore is a main screw 56 and in the side bores 52 and 53 are auxiliary screws 57 and 58 respectively, which are in intermeshing engagement with the main screw. The side screws serve to close the grooves between the threads of the main screw, the screw surface being so shaped as to form a fluid sealing fit to each other. The external surfaces of each of the screws form a fluid sealing fit with the walls of the respective bores. Across the bottom of the metering chamber 50 there is secured a narrow bar or strap 59 extending directly under the axes of the screws. These screws are provided with pivot bearings 60 at their ends which rest on the bar 59.

Mounted over the top of the metering chamber 50 is a gear box 61, the lower surface of which forms thrust bearings for the upper ends of the main screw 56 and auxiliary screws 57 and 58. The upper end of the main screw has a spindle 62 extending through a bearing 63 into the gear box 61 which bearing is preferably made of bonded carbon or graphite. The spindle 62 carries a pinion 64 that meshes with an idler gear 65 having secured thereto a pinion 66. The gear 65 and pinion 66 have shafts or journals 67 extending into bearings 68 mounted in the upper and lower walls of the gear box 61. The bearings 68 are also made of bonded carbon or graphite. The pinion 66 meshes with a gear 69' mounted at the lower end of an elongated vertical drive shaft 69.

The outlet chamber of the meter is provided with a cover 70 removably secured thereto, which cover carries three vertically extending supporting rods 71 that support a register mechanism 72 of the customary type. The shaft 69 extends up into the register mechanism and is in driving connection with the gears therein. The drive shaft is provided with an extended housing 73 secured gas tightly to the cover 70 and carrying a packing box 74 at its upper end near the register mechanism 72. A plastic packing is preferably arranged in the customary manner within the box 74 to provide a gas-tight seal around the drive shaft 69. The drive shaft 69 and the housing 73 are preferably made of a metal having a relatively low heat conductivity and the length of the housing 73 is such that the packing in box 74 will remain at or close to the ambient temperatures when the metering chamber is operating at the low temperature of the liquefied gas. The rods 71 are likewise preferably made of a metal of relatively low heat conductivity in order that the register 72 may remain close to ambient temperatures so that the register will not collect frost which might interfere with its proper operation and prevent accurate reading of the dials.

The meter is also provided with means for cooling the metering chamber by heat exchange with a stream of liquid having the same temperature as the liquid to be measured. To this end there is provided a jacket 75 substantially surrounding the walls of the inlet chamber 54 and the outlet chamber 55. The space between the jacket 75 and the walls of the inlet and outlet chambers provides a cooling chamber or passage 76 which has an inlet connection 27 and an outlet connection 29.

In the type of meter hereindescribed the liquid oxygen flows upwardly through the metering chamber 50, and in effecting its passage therethrough, rotates the main screw 56 at a rate proportional to the volumetric rate of flow of liquid. The auxiliary screws 57 and 58 rotate freely while maintaining a liquid seal. Either the metering chamber 50 or the screws 56, 57, and 58 may be formed of a self-lubricating material which is inert with respect to the liquid being pumped. It is found preferable however, to form the screws of such material and for metering liquid oxygen the material preferred is a form of structurally strong bonded graphite or carbon. In the claims where the term "bonded carbon" is used, it will be understood that "bonded graphite" is included.

Although the particular process and apparatus described in detail above is particularly suitable for metering liquid oxygen it is to be understood that the principles of the invention are adapted to the metering of other liquefied gases having normal boiling points below about 233 degrees Kelvin, for example, liquid nitrogen. It also will be understood that certain changes in carrying out the above process and in the constructions set forth may be made without departing from the principles of the invention.

I claim:

1. A process of measuring accurately a quantity of liquefied gas of the type having a boiling point at atmospheric pressure below 233° K. when transferred from a supply container wherein it is transported at low temperature and substantially atmospheric pressure to a receiver located at a place of use, which process comprises precooling the metering elements of a volumetric liquid meter adapted to register the amount of a liquid passed therethrough to a temperature substantially equal to that of the liquid in the supply container; increasing the pressure of the liquefied gas; then forcing said quantity of liquefied gas from said supply container through the precooled metering elements to the receiver while maintaining the pressure on said quantity of liquefied gas during such passage at a value higher than its vapor pressure at the temperature of the liquefied gas in said supply container, whereby only the quantity of said liquid entering said receiver is measured.

2. A process of measuring accurately a quantity of liquefied gas of the type having a boiling point at atmospheric pressure below 233° K. when transferred from a supply container wherein it is transported at low temperature and substantially atmospheric pressure to a receiver located at a place of use, which process comprises precooling the metering elements of a volumetric liquid meter adapted to register the amount of a liquid passed therethrough by effecting heat exchange between said elements and an unmetered portion of the liquefied gas from said supply container to cool said elements to substantially the temperature of such unmetered portion of the liquefied gas; increasing the pressure of the liquefied gas, and thereafter forcing said quantity of liquefied gas from said source through the precooled metering elements to the receiver while maintaining the pressure on said quantity of liquefied gas during such passage at a value higher than its vapor pressure at the temperature of the liquefied gas in said supply container, whereby only the quantity of said liquid entering said receiver is measured.

3. A process of measuring accurately a quantity of liquefied gas of the type having a boiling point at atmospheric pressure below 233° K. when transferred from a supply source at low temperature to a receiver, which process comprises passing a sufficient unmetered portion of the liquefied gas from said source in heat exchanging relation with the metering elements of a positive displacement fluid meter adapted to register the amount of a liquid passed therethrough to precool said metering elements to substantially the temperature of said unmetered portions; maintaining the pressure in said receiver at a value substantially higher than the vapor pressure of said liquefied gas at the temperature of said source; then forcing said quantity of liquefied gas from said source through the precooled metering elements to said receiver against the pressure therein.

4. A process of measuring accurately a quantity of liquefied gas of the type having a boiling point at atmospheric pressure below 233° K. when transferred from a supply source at low temperature by pumping means through the metering elements of a positive displacement meter adapted to register the amount of a fluid passed therethrough to a receiver, which process comprises precooling the pumping means and the metering elements by passing a portion of said liquefied gas from said source in heat exchange relation with said pumping means and said metering chamber sufficient to precool them to substantially the temperature of such portion of liquefied gas without operating said metering elements; returning gas material of said portion to said source after said heat exchange; maintaining the pressure in said receiver at a value greater than the pressure of the liquefied gas at said source; then pumping said quantity of liquefied gas through such precooled metering elements to said receiver against the pressure therein to measure accurately the quantity of liquefied gas entering the receiver.

5. A process of charging a measured quantity of liquefied gas such as liquid oxygen or nitrogen into a converter device for holding liquefied gas and gasifying portions thereof for delivery under pressure as required for use, which process comprises precooling the metering elements of a positive displacement meter adapted to register the amount of a fluid passed therethrough by passing a portion of liquefied gas from a supply container holding the liquefied gas at low temperature and at a pressure below that of said converter in heat exchanging and non-metering relation to said metering elements; returning gas material of said portion to said supply container after such heat exchange; and, while continuing the delivery of gas from said converter as required for use, pumping said quantity of liquefied gas through the precooled metering elements from said supply container to said converter against the pressure therein, whereby said converter is charged with an accurately measured quantity of the liquefied gas without interruption of the delivery of gas therefrom.

6. In a system for measuring a quantity of liquefied gas of the type having a boiling point at atmospheric pressure below 233° K. when transferred from an insulated supply container to a receiving vessel through a transfer passage connecting the liquid space of said supply container to said receiving vessel, said transfer passage having interposed therein a flow controlling means and a positive displacement meter containing metering elements adapted to register the amount of fluid passed therethrough, the combination with said system of means for precooling said metering elements comprising a cooling conduit connected to withdraw an unmetered portion of said liquefied gas from said supply container, constructed and arranged to pass said unmetered portion in heat exchanging relation to said metering elements without operating same, and connected to return gas material of said unmetered portion after such heat exchange to said supply container.

7. In a system for measuring a quantity of liquefied gas of the type having a boiling point at atmospheric pressure below 233° K. when charged into a receiving vessel under pressure, such system including an insulated supply container holding said liquefied gas at low temperature, a pump connected to receive liquefied gas from said supply container, a transfer passage connecting the discharge of the pump to said receiving vessel, and a positive displacement meter having metering elements interposed in said transfer pasage, the combination with such system of means for precooling said metering elements comprising, a cooling passage associated with said metering elements, a conduit connection between the discharge of the pump and said cooling passage, a conduit connection from said cooling passage to said supply container, and valve means controlling flow of a portion of liquefied gas through said cooling passage; the construction and arrangement being such that when the metering elements are precooled, and said valve means is closed, further portions of liquefied gas discharged by the pump will pass through the metering elements to said receiving vessel against the pressure therein, such further portions being thereby accurately measured.

8. A meter for liquefied gases having boiling points below 233° K. which has a metering chamber comprising upright intersecting bores, upright rotary intermeshing screws disposed each in one of said bores and in liquid sealing engagement with the wall thereof, said screws being formed of solid self-lubricating material; a register mounted at a substantial distance above said metering chamber; an operative connection between said register and one of said screws including a shaft having low thermal conduction; a housing having low thermal conduction about said shaft and extending upwardly from said chamber; and a shaft seal for said shaft at the end of said housing adjacent said register for retaining a gas pocket in said housing.

RUSSELL M. THAYER.

(References on following page)

REFERENCES CITED

The following references are of record in the file of this patent:

UNITED STATES PATENTS

| Number | Name | Date |
|---|---|---|
| Re. 14,455 | Hanks | Apr. 2, 1918 |
| 1,182,354 | Cotabish | May 9, 1916 |
| 1,508,519 | Horne | Sept. 16, 1924 |
| 1,691,039 | Anderson | Nov. 13, 1928 |
| 2,007,251 | Kniskern | July 9, 1935 |
| 2,015,946 | Marden | Oct. 1, 1935 |
| 2,049,239 | Wilcox | July 28, 1936 |
| 2,079,083 | Montelius | May 4, 1937 |
| 2,163,444 | Bassett | June 20, 1939 |
| 2,217,643 | Rude | Oct. 8, 1940 |
| 2,268,174 | Spanko | Dec. 30, 1941 |
| 2,291,678 | Benz et al. | Aug. 4, 1942 |

FOREIGN PATENTS

| Number | Country | Date |
|---|---|---|
| 457,372 | Great Britain | Nov. 26, 1926 |
| 823,236 | France | Oct. 11, 1937 |